(12) United States Patent
Suehiro et al.

(10) Patent No.: US 6,234,655 B1
(45) Date of Patent: May 22, 2001

(54) AUTOMOBILE HEADLAMP HAVING LIGHT DISTRIBUTION SWITCHING MECHANISM

(75) Inventors: Yoshio Suehiro; Katutada Shirai, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/318,272

(22) Filed: May 25, 1999

(30) Foreign Application Priority Data

May 25, 1998 (JP) .................................................. 10-142511

(51) Int. Cl.[7] ...................................................... B60Q 1/06
(52) U.S. Cl. ............................................ 362/515; 362/528
(58) Field of Search .................................... 362/514, 528, 362/515, 465, 469, 523

(56) References Cited

U.S. PATENT DOCUMENTS

| | | | |
|---|---|---|---|
| 5,032,964 | * 7/1991 | Endo et al. ............................ | 362/462 |
| 5,546,283 | 8/1996 | Ohtsuka et al. ...................... | 362/528 |
| 5,615,939 | * 4/1997 | Dobler et al. ......................... | 362/514 |
| 5,678,915 | 10/1997 | Shirai et al. .......................... | 362/460 |

* cited by examiner

Primary Examiner—Alan Cariaso
(74) Attorney, Agent, or Firm—Sughrue, Mion, Zinn, Macpeak & Seas, PLLC

(57) ABSTRACT

A reflector 20 installed in a lamp body 10 of a headlamp is supported by an aiming mechanism E1 in such a way as to adjustably tilt the reflector 20. The aiming mechanism E1 includes one ball joint 13 which is held between the reflector 20 and the lamp body 10, two aiming screws 16 and 18 which are each rotatably supported by the lamp body 10, and nut members 17 and 19 which are each screwed onto the aiming screws 16 and 18 and integrally fitted to the reflector 20. The reflector 20 is fitted with a light-distribution switching mechanism F1 for alternatively switching between light distribution for a low beam and light distribution for a high beam. Each of the nut members 17 and 19 is carried by a pair of vertically opposed horizontal ribs 52 and 52 extendedly formed in the lamp body 10 so that a reflector-side load (weight) acting on the aiming mechanism E1 is reduced to ensure smooth aiming and the formation of adequate light distribution.

8 Claims, 9 Drawing Sheets

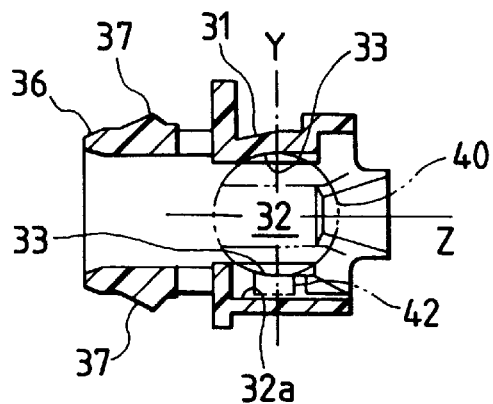
FIG. 8
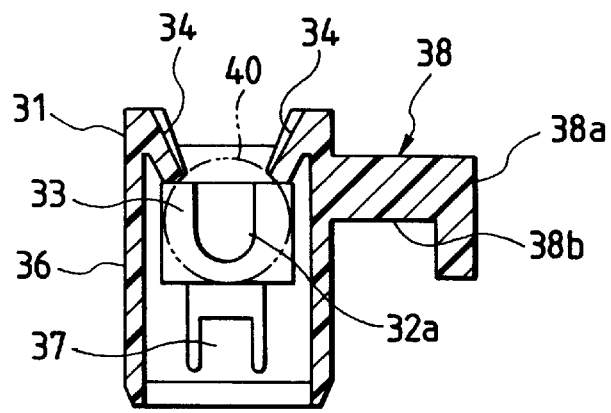
FIG. 9
FIG. 10
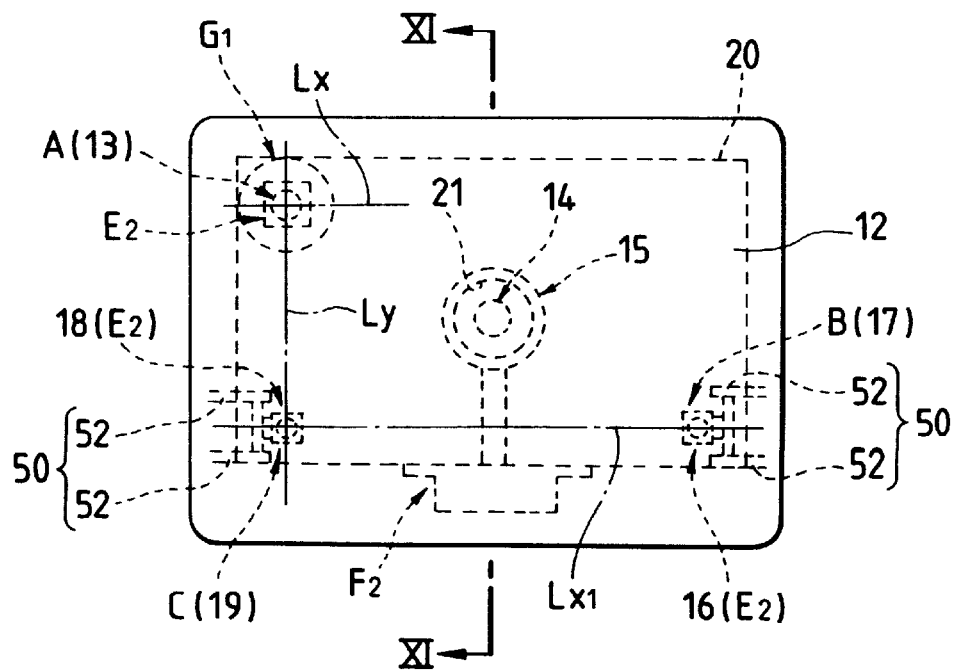

AUTOMOBILE HEADLAMP HAVING LIGHT DISTRIBUTION SWITCHING MECHANISM

BACKGROUND OF THE INVENTION

1. Field of the Invention

This invention relates to an automobile headlamp having a reflector supported by an aiming mechanism in a lamp body so that the tilting direction of the reflector can be regulated, and more particularly to an automobile headlamp having a reflector fitted with a light-distribution switching mechanism for alternatively switching between light distribution for a low beam and that for a high beam.

2. Description of the Related Art

In a conventional headlamp of the sort mentioned above, a reflector 2 fitted with a light source bulb 3 is as shown in FIGS. 15 and 16 tiltably supported by an aiming mechanism 4 (including two aiming screws 4a and 4b, two nut members 5a and 5b on the reflector 2 side which are screwed onto the respective screws 4a and 4b, and one ball joint 4c) in a lamp body 1. A direction of optical axis L can thus be regulated by tilting the reflector 2 by pivoting the aiming screws 4a and 4b around a horizontal tilting axis Lx (an axis connecting the nut member 5b and the ball joint 4c) and a vertical tilting axis Ly (an axis connecting the nut member 5a and the ball joint 4c). Reference numeral 8 denotes a front lens which is integrally fitted in the front opening of the lamp body 1.

Moreover, a shade 6 for blocking off part of the light directed to the reflector 2 in order to form a predetermined light-distribution pattern is provided around the bulb 3. The shade 6 is supported by a longitudinally-slidable slider 7a and capable of moving along the optical axis L. When the shade 6 is moved to a solid-line position of FIG. 16, then a part of the reflector 2 is functioning as an effective reflective surface, whereby the light distribution for the low beam is formed, whereas when the shade 6 is moved to an imaginary-line position of FIG. 16, then the remaining part of the reflector 2 is also functioning as an effective reflective surface, whereby the light distribution for the high beam is formed. In other words, the slider 7a caused by a motor 7b to run longitudinally forms a light-distribution switching mechanism 7 for alternatively switching between the light distribution for the low beam and that for the high beam.

Since the light-distribution switching mechanism 7 is provided for the reflector 2 in the aforementioned conventional headlamp, however, a reflector-side load (weight) applied onto the aiming mechanism 4 (including the two aiming screws 4a and 4b, the two nut members 5a and 5b, and the one ball joint 4c) becomes heavy. Consequently, smooth optical axis adjustment becomes difficult because the pivoting torque of the aiming screws 4a and 4b is stronger.

There are also other problems arising from failing to obtain adequate light distribution because the bending of the aiming screws 4a and 4b used for supporting the reflector 2 in a cantilever style causes the reflector 2 to sag, and making light distribution oscillate vertically because the reflector 2 is pivoted in the vertical direction.

SUMMARY OF THE INVENTION

An object of the present invention made in consideration of the foregoing problems is to provide an automobile headlamp so constructed that even though a light-distribution switching mechanism for alternatively switching between light distribution for a low beam and that for a high beam is provided for a reflector, no greater load is applied to an aiming mechanism for supporting the reflector in such a way that the tilting direction of the reflector can be regulated.

In order to accomplish the above object, in this invention, an automobile headlamp is comprised of a container-like lamp body, a discharge bulb provided in the lamp body, a reflector which is installed in the lamp body and used for reflecting and distributing light from the discharge bulb forwardly, and an aiming mechanism which is held between the reflector and the lamp body and used for supporting the reflector with respect to the lamp body in such a way as to adjustably tilt the reflector. The aiming mechanism includes one ball joint which is held between the reflector and the lamp body and forms the tilting fulcrum of the reflector, two aiming screws which are each rotatably supported by screw inserting holes bored in the lamp body and forwardly extended, and nut members which are each screwed onto the aiming screws, integrally fitted to the reflector and moved longitudinally along the aiming screws when the aiming screws are pivoted.

The reflector is fitted with a light-distribution switching mechanism for alternatively switching between light distribution for a low beam and light distribution for a high beam and that horizontally extended portions are formed in parallel to the aiming screws in order to carry the respective nut members in the lamp body.

The reflector is tilted by pivoting the aiming screws so as to make the tilting of the optical axis of the lamp adjustable and the light-distribution switching mechanism is driven to alternatively switch between the light distribution for the low beam and that for the high beam.

Although the reflector-side load (weight) applied via the nut members to the aiming mechanism is greater to the extent that the reflector is fitted with the light-distribution switching mechanism, the reflector-side load (weight) applied to the aiming mechanism becomes decreased in comparison with the conventional structure because the nut members are carried by the horizontally extended portions formed in the lamp body.

Consequently, the pivoting torque of the aiming screws remains small. Moreover, the aiming screws become hardly bent, thus resulting in restraining the reflector from sagging and vertically pivoting.

In this invention, each of the nut members includes a plastic ball nut which is screwed onto the aiming screw, and a plastic ball bearing which is fitted to the bracket of the reflector, used for relatively pivotally supporting the ball nut around the vertical and horizontal axes of the nut and baffling the ball nut around the longitudinal axis of the nut in the automobile headlamp of this invention.

When the aiming screws are pivotally turned, the nut members as the fulcrum of the reflector are moved longitudinally (along the aiming screws) with respect to the fixed fulcrum (the ball joint), so that the tilting of the reflector is adjusted. However, the ball nuts screwed onto the aiming screws are pivoted (around the vertical or/and horizontal axes of the respective nuts) with respect to the ball bearing integrally fitted to the reflector, whereby no unexpected stress is generated between the ball nuts (the aiming screws) and the ball bearing (the nut members).

In this invention, the horizontally extended portion is formed with a pair of vertically opposed horizontal ribs, wherein the ball bearing of the nut member is provided with elastic contact leaves like leaf springs which are pressure-welded to the respective horizontal ribs and wherein the nut member is longitudinally slidably held between the opposed horizontal ribs in the automobile headlamp of this invention.

The nut member is longitudinally slidably held between the opposed horizontal ribs to ensure that the vertical pivoting of the reflector is suppressed.

In this invention, a contact portion which is brought into contact with the horizontally extended portion of the nut member is in an arcuate form extended in the direction in which the nut member is moved longitudinally in the automobile headlamp of this invention.

The slide frictional force between the arcuate contact portion and the horizontal extended portion (the horizontal rib) on the nut member side is smaller than that in a case where the horizontal extended portion and the contact portion on the nut member side are flat, so that the nut member is allowed to move slidably and smoothly along the horizontal extended portion (the horizontal rib).

In this invention, the elastic contact leaf in the form of a leaf spring is provided on the upper side of the ball bearing in the automobile headlamp of this invention.

When the elastic contact leaf is provided on the lower side of the ball bearing, the weight of the reflector is applied to the elastic contact leaf as a load and this tends to make the elastic contact leaf sink down. When the elastic contact leaf is provided on the upper side of the ball bearing, however, only urging force of the spring pressure-welded to the horizontal rib acts, thus never causing the weight of the reflector to act as a load. Consequently, the elastic contact leaf hardly sinks down.

In this invention, a side frame which is L-shaped in horizontal cross section is extendedly formed toward at least the side wall of the lamp body on both sides of the ball bearing and wherein the side frame with the elastic contact leaf is held between the opposed horizontal ribs in the automobile headlamp of this invention.

As it is only needed to form the horizontal ribs so that the side frame of the ball bearing may be held therebetween, the amount of projection of the horizontal ribs to the inside of the lamp body is kept small.

When the side frame is formed on both lateral sides of the elastic contact leaf, the ball bearing (the nut member) fitted to the bracket of the reflector can be used commonly for the side frames.

In this invention, the two aiming screws are provided horizontally in front elevation, wherein the ball joint is provided in a position above or below the aiming screws and wherein the ball joint is coupled to the longitudinally movable rod of an auto leveling mechanism in response to the vertical inclination of the axle shaft of the automobile of this invention.

When the auto leveling mechanism is driven, the reflector is caused to tilt around the horizontal tilting axis connecting both the lateral nut members, whereby the light distribution is automatically adjusted vertically.

In this invention, the auto leveling mechanism is also used as the light-distribution switching mechanism in the automobile headlamp of this invention, so that the automobile headlamp is simplified in construction.

BRIEF DESCRIPTION OF THE DRAWINGS

FIG. 7(*b*) is an elevational view of the nut member.

FIG. 7(*c*) is a right-side view of the nut member.

FIG. 7(*d*) is a rear view of the nut member.

FIG. 8 is a vertical sectional view of the nut member (a sectional view taken on line VIII—VIII of FIG. 7(*a*)).

FIG. 9 is a horizontal sectional view of the nut member (a sectional view taken on line IX—IX of FIG. 7(*a*)).

FIG. 10 is an elevational view of the two-lamp type automobile headlamp as a second embodiment of the invention.

DESCRIPTION OF THE PREFERRED EMBODIMENTS

A mode for carrying out the invention will now be described with reference to the embodiments thereof.

Figure 1:
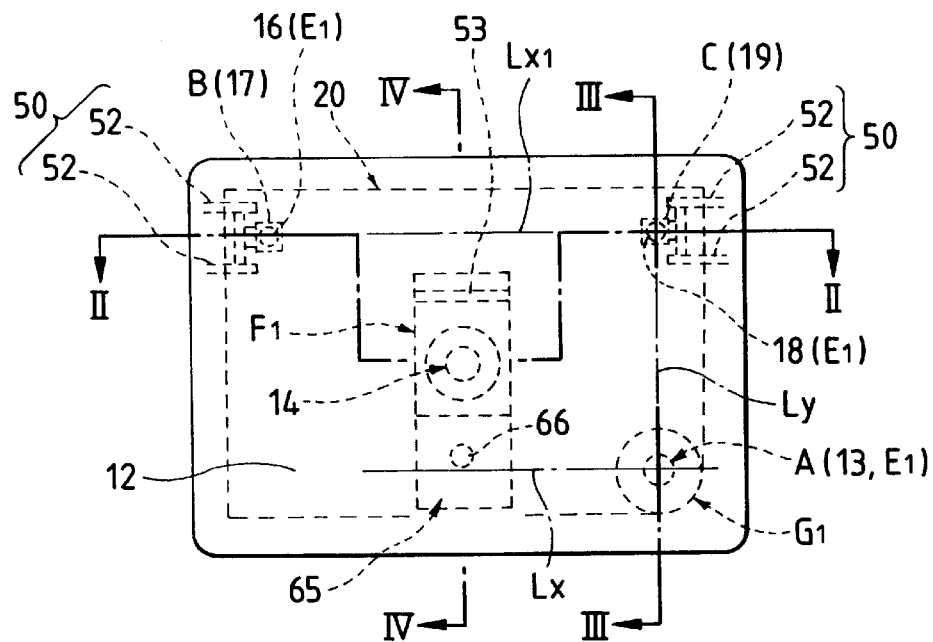
FIG. 1 is an elevational view of a two-lamps type headlamp as a first embodiment of the invention.
Figure 3:
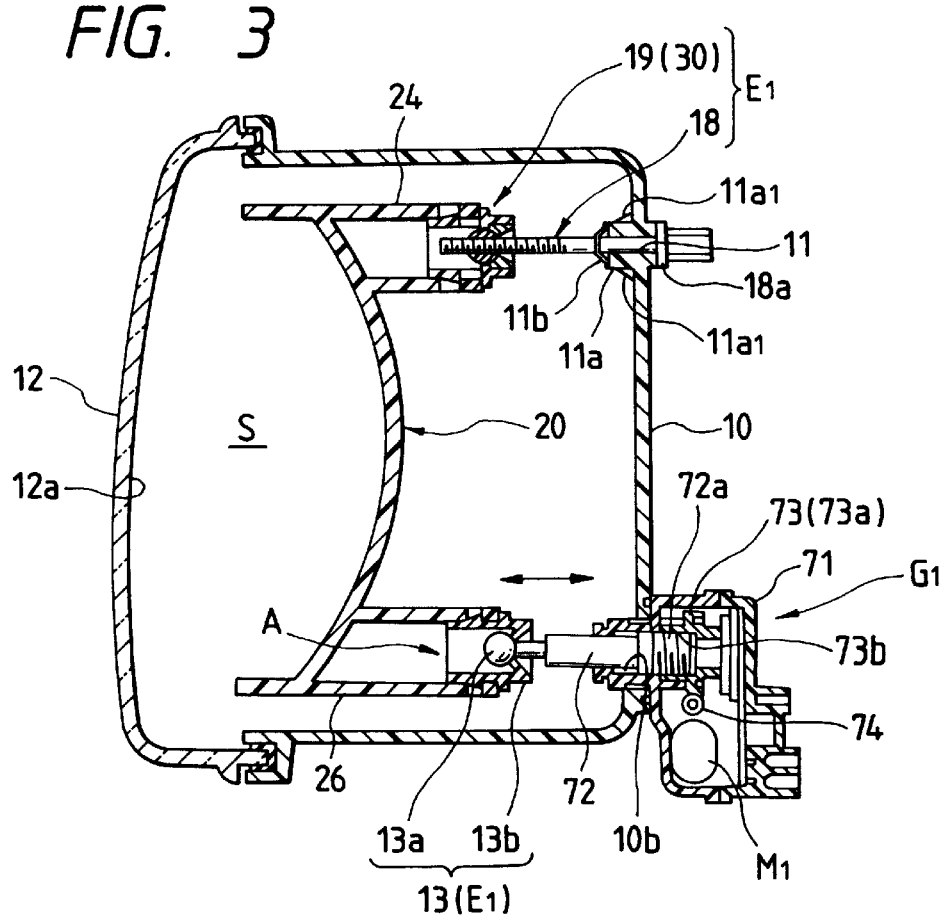
FIG. 3 is a vertical sectional view of the headlamp (a sectional view taken on line III—III of FIG. 1).
Figure 2:
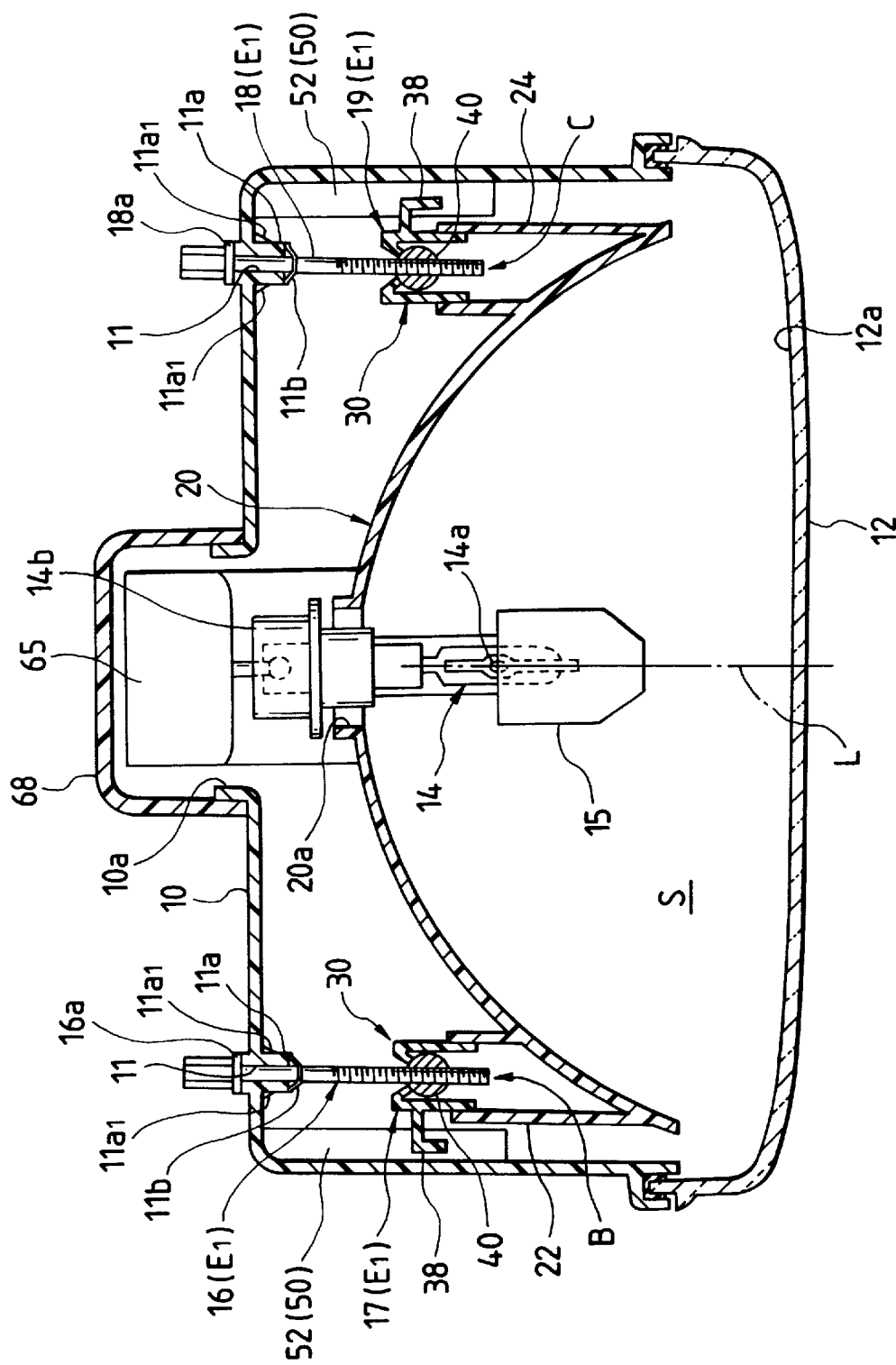
FIG. 2 is a horizontal sectional view of the reflector (a sectional view taken on line II—II of FIG. 1).
Figure 4:
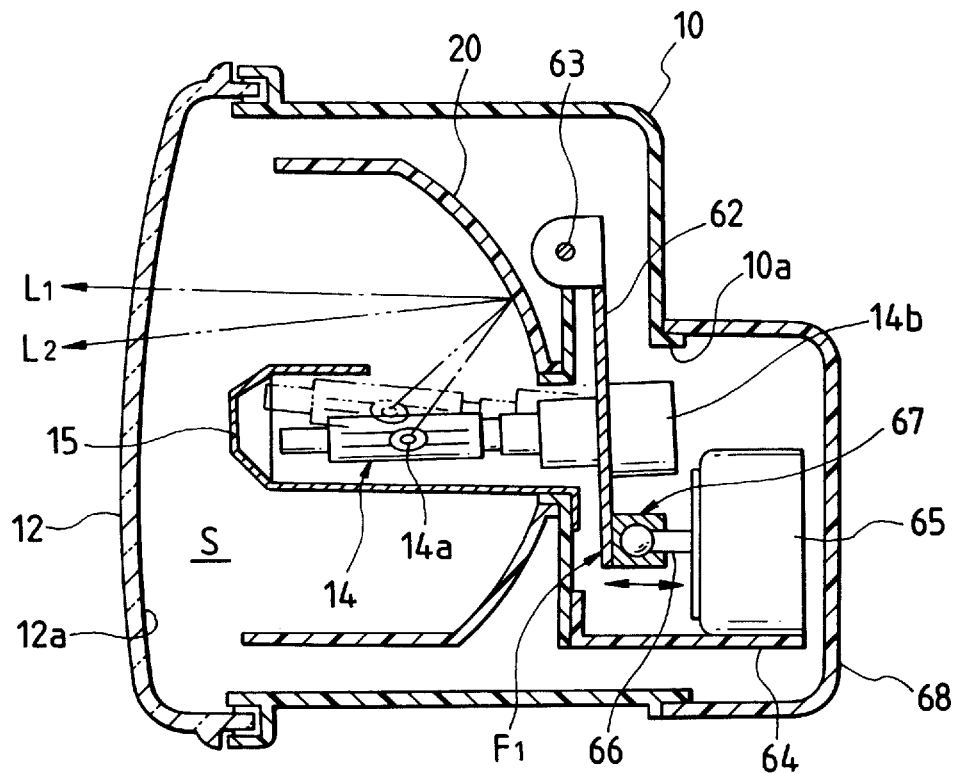
FIG. 4 is a vertical sectional view of the headlamp (a sectional view taken on line IV—IV of FIG. 1).
Figure 6:
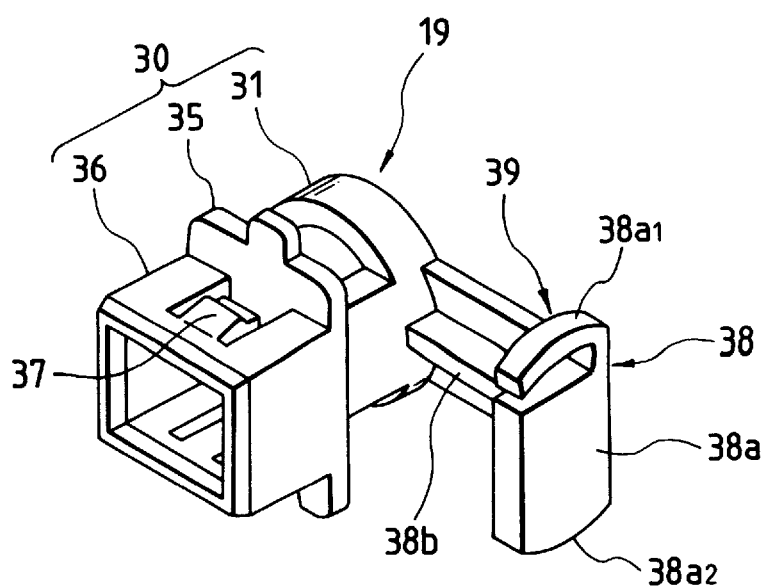
FIG. 6 is a perspective view of a nut member.
Figure 5:
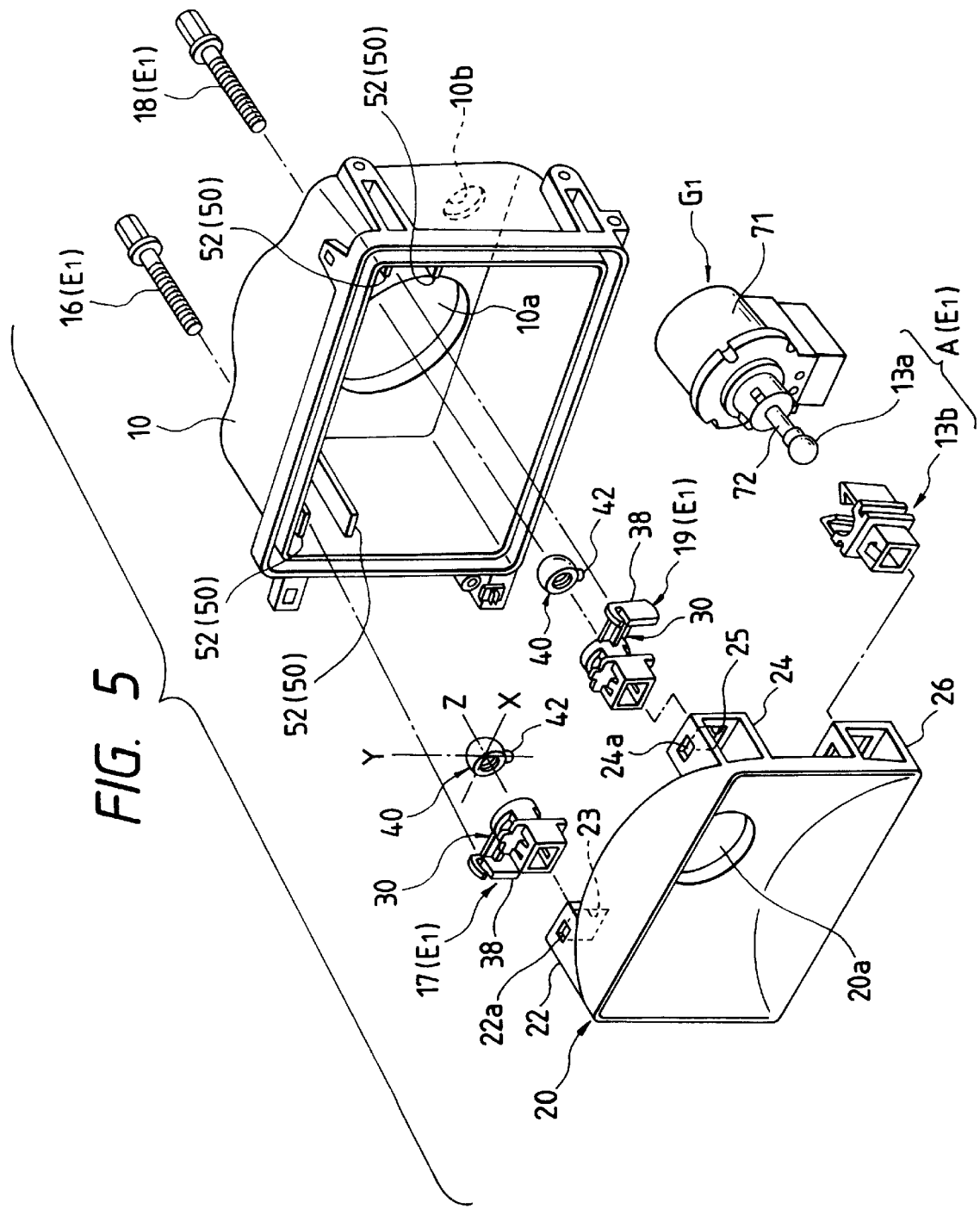
FIG. 5 is a exploded perspective view of aiming mechanisms and an auto leveling mechanism of the headlamp.
Figure 7A:
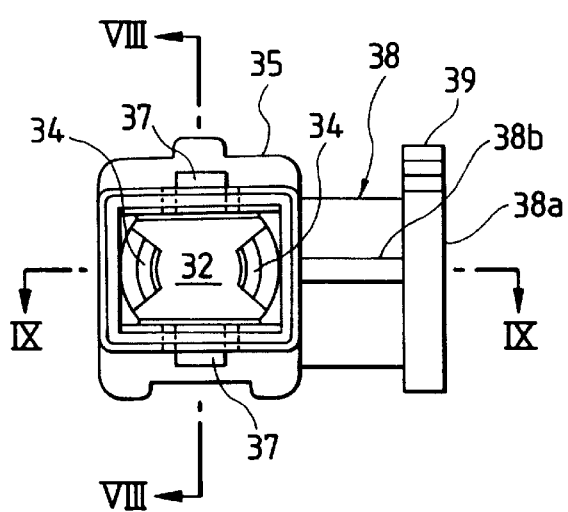
FIG. 7(*a*) is an elevational view of the nut member.
Figure 7C:
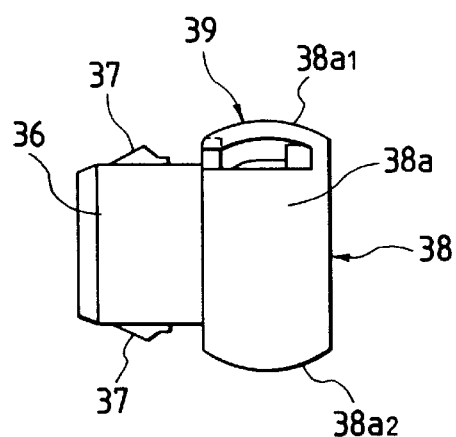
Figure 7B:
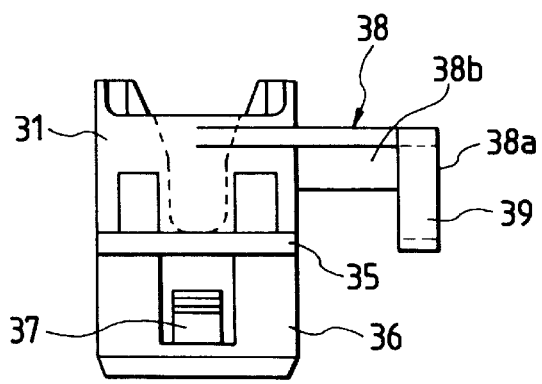
Figure 7D:
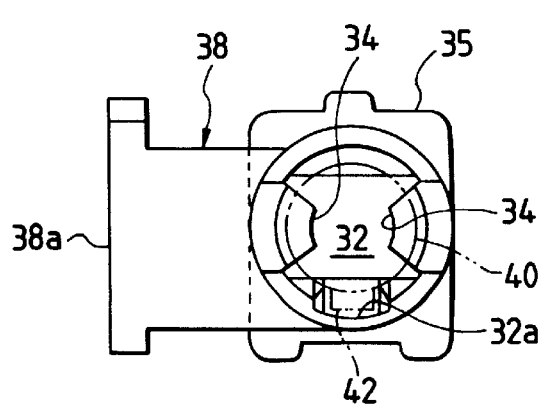

FIGS. 1–9 show a first embodiment of the invention, wherein FIG. 1 is an elevational view of a two-lamps type headlamp; FIG. 2, a horizontal sectional view of its reflector (a sectional view taken on line II—II of FIG. 1); FIG. 3, a vertical sectional view of the headlamp (a sectional view taken on line III—III of FIG. 1); FIG. 4, a vertical sectional view of the headlamp (a sectional view taken on line IV—IV of FIG. 1); FIG. 5, an exploded perspective view of aiming mechanisms and an auto leveling mechanism of the headlamp; FIG. 6, a perspective view of a nut member; FIG. 7(*a*), an elevational view of the nut member, FIG. 7(*b*), an elevational view of the nut member, FIG. 7(*c*), a right-side view of the nut member, and FIG. 7(*d*), a rear view of the nut member; FIG. 8, a vertical sectional view of the nut member (a sectional view taken on line VIII—VIII of FIG. 7(*a*)); and FIG. 9, a horizontal sectional view of the nut member (a sectional view taken on line IX—IX of FIG. 7(*a*)).

In these drawings, reference numeral 10 denotes a plastic container-like lamp body having a front opening into which a front lens 12 is fitted so as to form a lamp chamber S. In the lamp body 10, that is, in the lamp chamber S, a reflector 20 for use in forming a low and a high beam is tiltably supported by aiming mechanisms E1. Further, a discharge bulb 14 is disposed in a predetermined central position of the reflector 20 so that a discharge center 14*a* is located close to the focal point of the reflector 20. Reference numeral 14*b* denotes a lighting-circuit housing unit which is integral with the rear end portion of the discharge bulb 14. A lighting circuit for making the discharge bulb 14 start discharging continuously and stably is contained in the unit 14*b*.

The aiming mechanism E1 comprises, as shown in FIGS. 1–3 and 5, one ball joint 13 (including a ball portion 13a supported on the lamp body 10 side, and a ball bearing member 13b fitted in a bracket 26 formed in the back of the reflector 20) forming the fixed tilting fulcrum A of the reflector 20, two aiming screws 16 and 18 which are rotatably supported by screw inserting holes 11 bored in the back wall of the lamp body 10 and extended forward, and nut members 17 and 19 which are screwed onto the respective aiming screws 16 and 18, integrally fitted to brackets 22 and 24 formed in the back of the reflector 20 and used to form the moving fulcrums B and C of the reflector 20.

Reference numeral 11a denotes bosses extended forward from the peripheral edge portions of the screw inserting holes 11 and by making the screw inserting holes 11 axially longer, the strength of portions for rotatably supporting the aiming screws 16 and 18 is increased. Reference numeral 11a1 denotes four ribs for reinforcing the strength of the bosses, the rib 11a1 being peripherally provided at two places of the root portion of each boss 11a. Reference numeral 11b denotes push-on fixes for axially fixing the aiming screws 16 and 18 inserted through the screw inserting holes 11 in cooperation with flanges 16a and 18a on the respective screw sides.

When the aiming screw 16 is turned, the reflector 20 is tilted around the vertical tilting axis Ly passed through the fixed tilting fulcrum A and the moving fulcrum C, so that the direction of the optical axis L of headlamp becomes tiltably and laterally adjustable. When both the aiming screws 16 and 18 are turned, the reflector 20 is tilted around the horizontal tilting axis (an axis parallel to the axis passed through the moving fulcrums B and C) passed through the fixed tilting fulcrum A, so that the direction of the optical axis L of the headlamp becomes tiltably and vertically adjustable.

More specifically, each of the nut members 17 and 19 includes, as shown in FIGS. 5–9, a cylindrical ball bearing body 30 formed with a longitudinal through-hole, and a ball nut 40 which is contained in a nut housing portion 32 in the cylindrical rear end portion 31 of the ball bearing body 30 and screwed onto the aiming screw 16 (18). In the nut housing portion 32, a bearing surface 33 matching the outer peripheral face of the ball nut 40 is formed and the ball nut 40 is pivotally supported relatively around the vertical axis Y and horizontal axis X of the nut. Further, a projection 42 projected from the ball nut 40 mates with a longitudinal groove 32a formed in the cylindrical rear end portion 31 (the nut housing portion 32), so that the ball nut 40 is baffled around the longitudinal axis Z of the nut.

A pair of tongue-like lateral retaining pieces 34 are obliquely extended inward on the inside of the opening of the cylindrical rear end portion 31 and when the ball nut 40 is press-fitted into the nut housing portion 32, the retaining pieces 34 is subjected to elastic deformation outward and do not hamper the press-fitting of the ball nut 40 and act as slip-off preventing members on the ball nut 40 thus press-fitted into nut housing portion 32.

The front end side of each ball bearing body 30 is formed into a rectangular cylindrical shape with a rectangular flange portion 35 as a boundary and opposed elastic hooks 37 are projected outward from the respective upper and lower side walls of the rectangular cylindrical front end portion 36. The rectangular cylindrical leading end portions 36 are mated with the rectangular holes 23 and 25 of the brackets 22 and 24 integral with the reflector 20, and the elastic hooks 37 and 37 are brought into lance engagement with the mating holes 22a and 24a on the brackets 22 and 24, so that the ball bearing bodies 30 (the nut members 17 and 19) are integrally fitted to the brackets 22 and 24.

A side frame 38 which is L-shaped in horizontal cross section is extended from the ball bearing body 30 side facing the side wall of the lamp body 10, and the upper and lower side edge portions 38a1 and 38a2 of the side wall 38a extended in the longitudinal direction of the side frame 38 are formed into an arc of a circle. Further, a belt-like elastic contact leaf 39 in the form of a leaf spring is provided in the upper edge portion of the side wall 38a. Reference numeral 38b denotes a side-frame reinforcing rib which is perpendicular to the side frame 38.

On the other hand, a horizontally extended portion 50 having a pair of vertically opposed horizontal ribs 52 and 52 are formed in parallel to each aiming screw 16 (18) on the inside of the side wall of the lamp body 10 as shown in FIGS. 1, 2 and 5. The side wall 38a of the side frame 38 of the ball bearing body 30 is held between the vertically opposed horizontal ribs 52 and 52, whereby the elastic contact leaf 39 in the form of a leaf spring is kept in contact with the upper horizontal rib 52. In other words, both the lateral end portions of the reflector 20 supported by the aiming mechanisms E1 in a cantilever fashion are supported by the respective vertically opposed horizontally extended portions 50 (the horizontal ribs 52).

Therefore, the weight of the reflector 20 is borne by the horizontally extended portions 50 (the pair of vertically opposed horizontal ribs 52) carrying the nut members 17 (19), and the weight of the reflector 20 never acts as a load between the ball bearing body 30 and the ball nut 40 and between the ball nut 40 and the aiming screw 16 (18). Consequently, no unexpected stress is produced between the ball bearing body 30 and the ball nut 40 and between the ball nut 40 and the aiming screw 16 (18), and the pivoting torque of the aiming screw 16 (18) remains small.

Since the upper and lower side edge portions 38a1 and 38a2 of the side frame 38 (the side wall 38a) which are made to slide along the vertically opposed horizontal ribs 52 are arcuate in particular, the slide frictional force between the nut member 17 (19) and the horizontal rib 52 is small, so that the nut member 17 (19) is capable of smoothly sliding longitudinally along the horizontally extended portion 50.

Accordingly, the nut member 17 (19) is smoothly moved longitudinally along the aiming screw 16 (18) as the aiming screw 16 (18) is pivoted and the optical axis can thus be adjusted speedily.

Since the aiming screw 16 (18) is held between the vertically opposed horizontal ribs 52 which form the horizontally extended portion 50, in other words, both the lateral end portions of the reflector 20 are supported by the horizontally extended portions 50 from below, the reflector 20 is prevented from sagging and vertically pivoting.

The elastic contact leaf 39 in the form of a leaf spring is provided on the upper side of the ball bearing body 30 and since the weight of the reflector 20 does not act as a load on the elastic contact leaf 39, the elastic contact leaf hardly sinks down and the nut members 17 and 19 have excellent durability to that extent.

Further, a link-type light-distribution switching mechanism F1 (see FIGS. 1 and 4) for alternatively switching between light distribution for a low beam and that for a high beam by pivoting the discharge bulb 14 with respect to a shade 5 for forming light distribution for the lamp is provided in the back of the reflector 20.

More specifically, the shade 15 for forming light distribution is fixed to the lower peripheral edge portion of the central circular hole 20a of the reflector 20 and extended forward in such a way as to surround the bulb 14. The light emitted from the discharge center 14a of the bulb 14 without being vignetted by the shade 15 is led to and reflected from the effective reflective surface of the reflector 20. The light is then diffused in a predetermined direction by a light-distribution control step (a diffusion step) 12a formed in the back of the front lens 12 so that predetermined light distribution is attained.

The discharge bulb 14 is pivotally supported by a link 62 around a horizontal support shaft 63, and an electromagnetic solenoid 65 as the actuator of the light-distribution switching mechanism F1 is fixedly mounted onto a bracket 64 extended toward the lower rear portion of the reflector 20. The lower end portion of the link 62 is coupled via a ball joint 67 to the longitudinally movable rod 66 of the electromagnetic solenoid 65.

The link 62 is pivoted when the electromagnetic solenoid 65 is operated, whereby the position of the discharging center 14a of the discharge bulb 14 is varied. As shown in FIG. 4, light from the discharging center 14a of the discharge bulb 14 is reflected by the reflector 20 as shown by reference character L1, so that the light distribution for the high beam is formed. When the discharging center 14a of the discharge bulb 14 is positioned on an imaginary line of FIG. 4 by pivoting the link 62 (the discharge bulb 14) forward by operating the electromagnetic solenoid 65, the light from the discharging center 14a of the discharge bulb 14 is reflected from the reflector 20 as shown by reference character L2, so that the light distribution for the low beam is formed. In this case, reference numeral 68 denotes a cover for covering an opening 10a provided in the lamp body 10 in order to dispose the light-distribution switching mechanism F1.

Reference character G1 denotes an auto leveling mechanism for holding the optical axis L of the lamp (the reflector 20) in parallel to the road surface. For example, it is known that the optical axis of the headlamp is directed upward in cases where the car loadage is great; the acceleration is increased; the slope of the road is steep; and so forth. In other words, since the interrelations between the optical axis of the headlamp and said factors are predictable matters, the auto leveling mechanism G1 is operated according to the vertically tilted amount of the vehicle due to the car loadage, the accelerated condition, the slope of the road, the unevenness of the road and the like so as to move the fixed tilting fulcrum A longitudinally (in the direction of a double-headed arrow of FIG. 3) whereby to keep the optical axis L of the headlamp parallel to the driving road surface at all times.

Reference numeral 71 denotes a unit case for containing the principal part of the auto leveling mechanism G1, the unit case being fixed to the back wall of the lamp body 10; 72, a longitudinally movable rod with the ball portion 13a as part of the fixed tilting fulcrum A formed at the tip of the rod. The longitudinally movable rod 72 is longitudinally passed through a hole 10b bored in the back wall of the lamp body 10 and also made longitudinally slidable by baffling with respect to the case 71. Reference numeral 73 denotes an outer tube disposed coaxially with the longitudinally movable rod 72 and fitted with a wheel 73a rotatably supported with the case 71, a female screw portion 73b formed on the inside of the outer tube 73 being screwed onto a make screw portion 72a at the rear end of the rod 72. A worm gear 73 rotated by a motor M1 as an actuator engages with the wheel 73a and when the motor M1 is driven, the rod 72 is moved longitudinally, whereby the fixed tilting fulcrum A is moved longitudinally. Then the reflector 20 is tilted around the horizontal tilting axis Lx1 connecting the moving fulcrums B and C, and the optical axis L is also tilted vertically.

Figure 11:
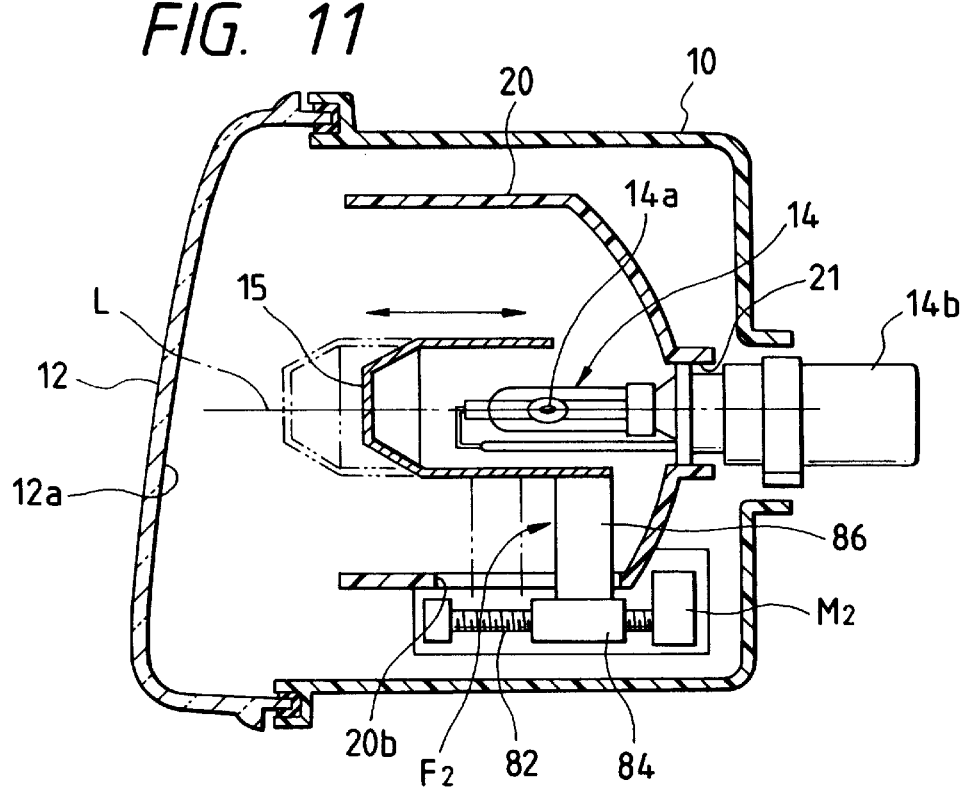
FIG. 11 is a vertical sectional view of the headlamp (a sectional view taken on line XI—XI of FIG. 10).

FIGS. 10 and 11 show a two-lamp type automobile headlamp as a second embodiment of the invention, wherein FIG. 10 is an elevational view of the two-lamp type automobile headlamp of the second embodiment thereof; and FIG. 11, a vertical sectional view of the headlamp (a sectional view taken on line XI—XI of FIG. 10).

According the first embodiment of the invention, the discharge bulb 14 supported by the link 62 of the light-distribution switching mechanism F1 is passed forwardly through the central circular hole 20a of the reflector 20, however, the discharge bulb according to this second embodiment is fitted into the bulb fitting hole 21 of the reflector 20.

In the aiming mechanism E1 according to the first embodiment of the invention, moreover, the nut members 17 and 19 screwed onto the aiming screw 16 (18) to form the moving fulcrums B and C of the reflector 20 are provided closer to the upper portion of the reflector 20, whereas the ball joint 13 forming the fixed tilting fulcrum A of the reflector 20 is provided closer to the lower portion of the reflector 20. In an aiming mechanism E2 according to the second embodiment of the invention, however, the nut members 17 and 19 forming the moving fulcrums B and C of the reflector 20 are provided closer to the lower portion of the reflector, whereas the ball joint 13 forming the fixed tilting fulcrum A of the reflector 20 is provided closer to the upper portion of the reflector 20.

Moreover, the light-distribution forming shade 15 covering the discharge bulb 14 is supported by a ball-screw sliding unit as a slide-type light-distribution switching mechanism F2 provided on the lower surface wall of the reflector 20. Reference character M2 denotes a motor for rotating a ball screw 82; 84, a slider incorporated with the ball screw 82 extended longitudinally; and 86, the leg portion of the shade 15 which is passed through a longitudinal groove 20b formed in the lower surface wall of the reflector 20 and fixed to the slider 84.

When the ball-screw sliding unit F2 is driven, the shade 15 is moved along the optical axis L and as shown by a solid line of FIG. 11, part of the light from the discharging center 14a of the discharge bulb 14 is blocked by the shade 15 when the shade 15 is moved to a back position and reflected from only the predetermined effective reflective surface of the reflector 20, so that a low beam is formed. As shown by an imaginary line of FIG. 11, on the other hand, the light is also led to the rest of the effective reflective surface of the reflector 20 and reflected therefrom, so that a high beam is formed.

The rest of the arrangement is same as that in the first embodiment of the invention and like reference characters are given to like component parts therein and the description thereof will be omitted.

Figure 12:
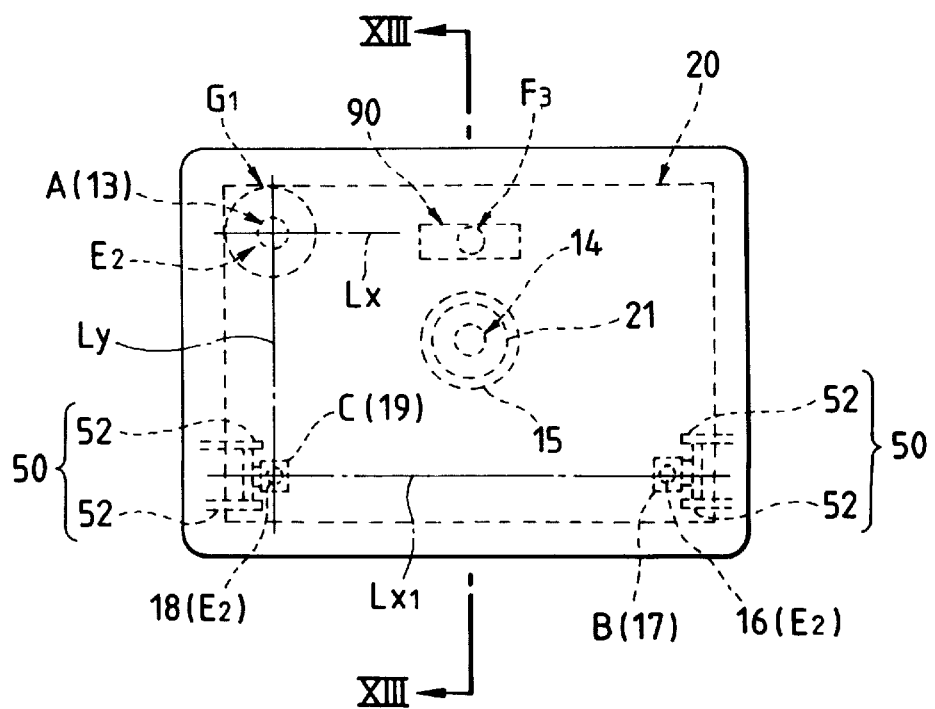
FIG. 12 is an elevational view of the two-lamp type automobile headlamp as a third embodiment of the invention.
Figure 13:
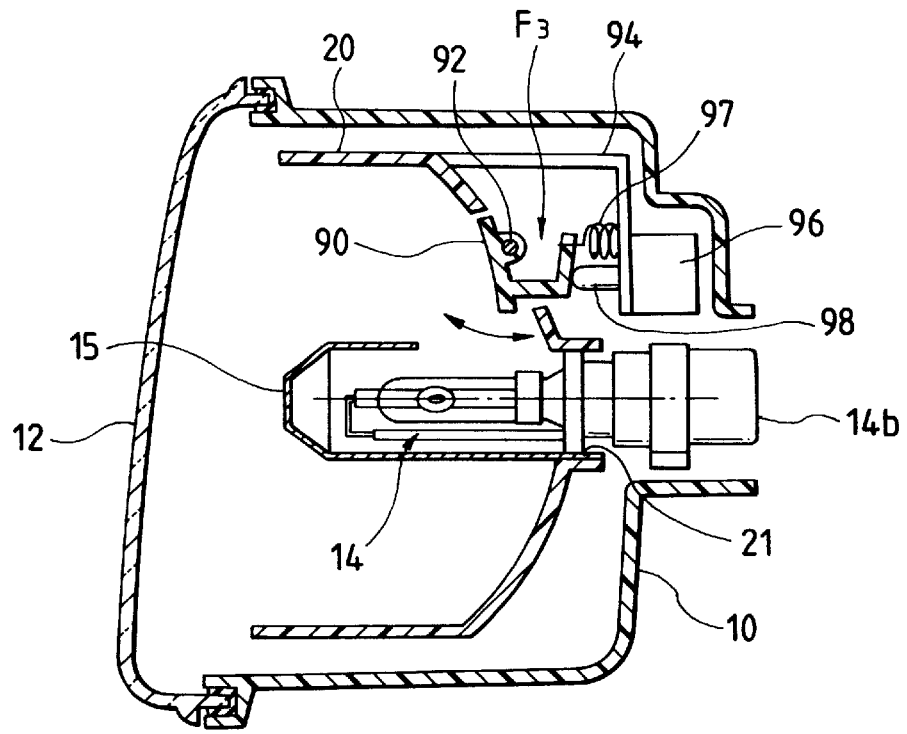
FIG. 13 is a vertical sectional view of the headlamp (a sectional view taken on line XIII—XIII of FIG. 10).
Figure 14:
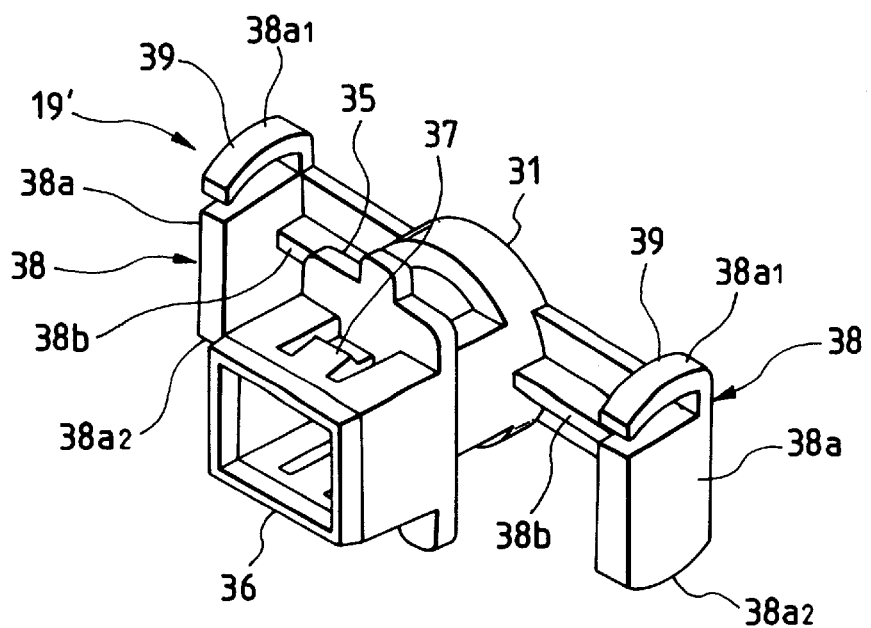
FIG. 14 is a perspective view of a nut member as the principal part of an automobile headlamp as a fourth embodiment of the invention.
Figure 15:
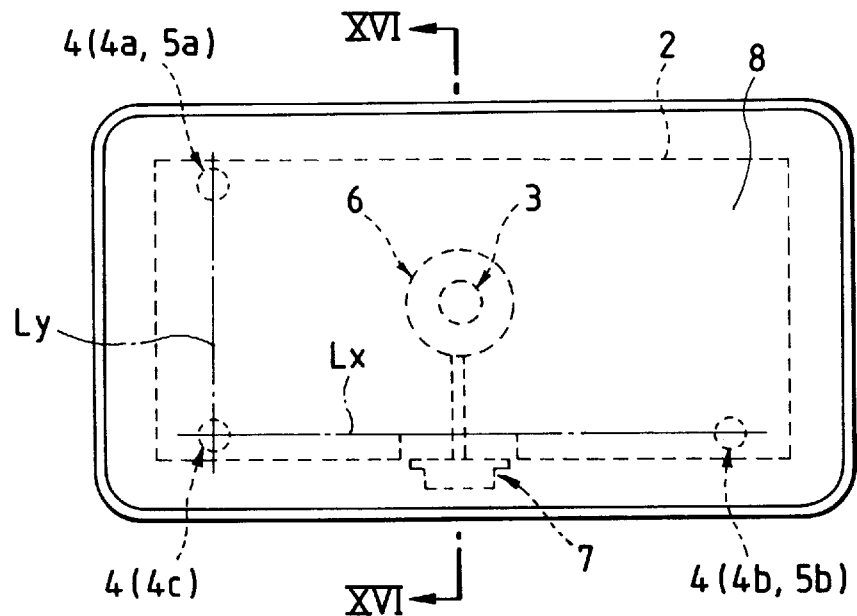
FIG. 15 is an elevational view of a conventional headlamp.
Figure 16:
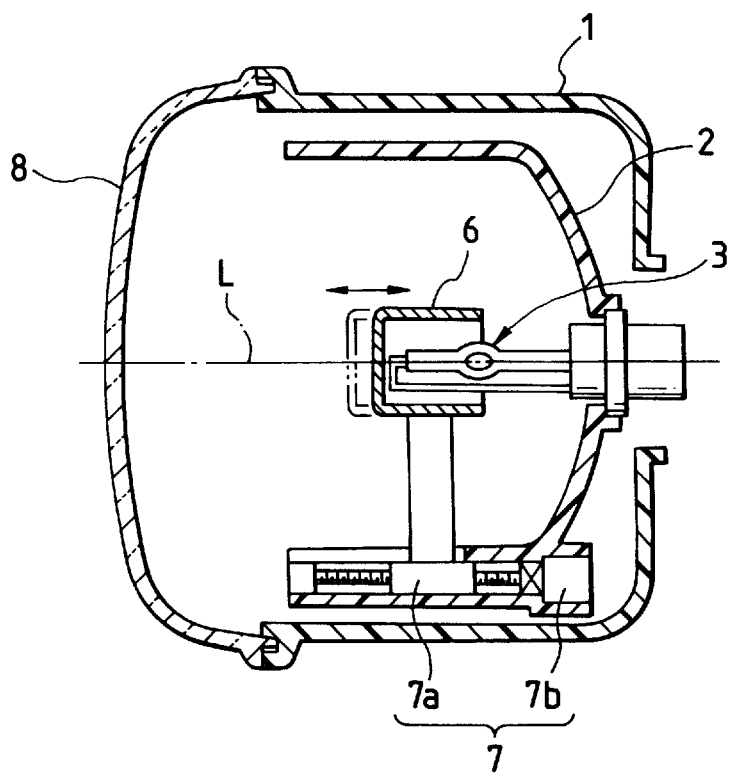
FIG. 16 is a vertical sectional view of the headlamp (a sectional view taken on line XVI—XVI of FIG. 15).

FIGS. 12 and 13 show a two-lamp type automobile headlamp as a third embodiment of the invention, wherein FIG. 12 is an elevational view of the two-lamp type automobile headlamp of the third embodiment thereof; and FIG. 13, a vertical sectional view of the headlamp (a sectional view taken on line XIII—XIII of FIG. 10).

The reflector 20 is supported by the aiming mechanism E2 so that the tilting of the reflector 20 is made adjustable like the reflector 20 according to the second embodiment of the invention. However, part of the reflector 20 is pivoted by an electromagnetic solenoid 96 in order to alternatively switch between light distribution for a low beam and light distribution for a high beam.

More specifically, a light-distribution switching mechanism E3 for switching between the low beam and the high beam according to this embodiment of the invention is arranged so that the predetermined upper area of the bulb fitting hole 21 of the reflector 20 is formed as a subreflector 90 and can be pivoted around a horizontal support shaft 92 with respect to the reflector (body) 20. Further, the electromagnetic solenoid 96 is fixed to a bracket 94 extendedly formed in the back of the reflector (body) 20, and the longitudinally movable rod 98 of the electromagnetic solenoid 96 is projected forward and used to push the subreflector 90 so as to alternatively switch between a light-distribution forming position for a high beam where the subreflector 90 is directed upward and a light-distribution forming position for a low beam where the subreflector 90 and the reflector (body) 20 are leveled. Reference numeral 97 denotes a return spring of the subreflector 90.

The rest of the arrangement is same as that in the second embodiment of the invention and like reference characters are given to like component parts therein and the description thereof will be omitted.

Although the side frame 38 has been formed only one side of the nut member 17 (19) according to the aforementioned embodiments of the invention, the side frame 38 may be formed on both lateral sides of a nut member 19' in order that a nut member common to both lateral nut members (the nut member screwed onto the aiming screw 16 and the nut member screwed onto the aiming screw 18) can be employed.

Although a description has been given of the case of incorporating the lighting-circuit housing unit 14b with the rear end portion of the discharge bulb according to the above embodiments of the invention, the lighting-circuit housing unit 14b is not incorporated with the discharge bulb 14 but may be such that the cord extended from the lighting circuit fixed to the lamp body 10 is connected to the discharge bulb via a connector.

Although the vertical pair of vertically opposed horizontal ribs 52 have been used to form the horizontally extended portion 50 so that the nut members 17 and 19 are held between the respective horizontal ribs 52 and 52 according to the above embodiment of the invention, one sheet of horizontal rib may be used to form the horizontally extended portion 50 so as to carry the nut members 17 and 19. In such a case as mentioned above, it is unnecessary to provide the elastic contact leaf for each of the nut members 17 and 19.

As is obvious from the description given up to now, the optical axis of the lamp is made adjustable by pivoting the aiming screws, and driving the light-distribution switching mechanism makes it feasible to alternatively switch between light distribution for a low beam and light distribution for a high beam in the automobile headlamp according to the present invention.

Since the reflector-side load (weight) applied to the aiming mechanism is small, moreover, the optical axis can be adjusted smoothly and while the reflector is prevented from sagging and vertically pivoting, adequate light distribution is formed.

Accordingly, the ball nuts screwed onto the respective aiming screws are capable of relatively pivoting around the vertical or/and horizontal axes of the nuts with respect to the ball bearings, whereby no unexpected stress is generated between the nut members and the brackets to ensure that the optical axis is made smoothly adjustable.

Accordingly, there is no fear that the light distribution is blurred vertically as the reflector is restrained from pivoting vertically for certain.

Accordingly, the slide frictional force between the arcuate contact portion and the horizontal extended portion (the horizontal rib) on the nut member side is small, so that the nut member is allowed to move slidably and smoothly along the horizontal extended portion (the horizontal rib). It is thus ensured that the optical axis is made smoothly adjustable.

Accordingly, the durability of the nut member is improved to ensure that the optical axis is made smoothly adjustable for a long time since the elastic contact leaf hardly sinks down.

Accordingly, the horizontal ribs hardly interfere with the reflector to the extent that the amount of projection of the horizontal ribs to the inside of the lamp body is small. The optical axis is made smoothly adjustable to that extent and the formation of the horizontal ribs is facilitated.

When the side frame is formed on both lateral sides of the elastic contact leaf, the ball bearing (the nut member) fitted to the bracket of the reflector can be used commonly for the side frames. Thus, the number of parts becomes reducible and this results in making the headlamp simple in construction and also facilitating the work of fitting the nut members.

Accordingly, in addition to adjusting the tilting of the optical axis by the aiming mechanism and switching between the light distribution for the low beam and that for the high beam by the light-distribution switching mechanism, the automatic optical axis adjustment can be made by the auto leveling mechanism, so that the driver is offered improved visual recognizability.

Accordingly, since the auto leveling mechanism is also used as the actuator of the light-distribution switching mechanism, so that the automobile headlamp is simplified in construction and lighter in weight.

What is claimed is:

1. An automobile headlamp comprising:
    a container-like lamp body;
    a discharge bulb provided in the lamp body;
    a reflector which is installed in the lamp body and used for reflecting and distributing light from the discharge bulb forwardly;
    an aiming mechanism which is held between the reflector and the lamp body and used for supporting the reflector with respect to the lamp body in such a way as to adjustably tilt the reflector, in which the aiming mechanism includes one ball joint which is held between the reflector and the lamp body and forms the tilting fulcrum of the reflector, two aiming screws which are each rotatably supported by screw inserting holes bored in the lamp body and forwardly extended, and nut members which are each screwed onto the aiming screws, integrally fitted to the reflector and moved longitudinally along the aiming screws when the aiming screws are pivoted;
    a light-distribution switching mechanism for alternatively switching between light distribution for a low beam and light distribution for a high beam; and
    horizontally extended portions which are formed in the lamp body and parallel to the aiming screws in order to support each of the nut members.

2. An automobile headlamp as claimed in claim 1, wherein each of the nut members includes a plastic ball nut which is screwed onto the aiming screw, and a plastic ball bearing which is fitted to the bracket of the reflector, used for supporting the plastic ball nut relatively pivotally around the vertical and horizontal axes of the plastic ball nut and baffling the plastic ball nut around the longitudinal axis of the plastic ball nut.

3. An automobile headlamp as claimed in claim 2, wherein each of the horizontally extended portions are formed with a pair of vertically opposed horizontal ribs, wherein the ball bearing of the nut members is provided with an elastic contact leaf which is pressure-welded onto the respective vertically opposed horizontal ribs and wherein each of the nut members is longitudinally slidably held between the pair of vertically opposed horizontal ribs.

4. An automobile headlamp as claimed in claim 1, wherein contact portions which are brought into contact with the horizontally extended portions of the nut members are in an arcuate form extending in the direction in which the nut members are moved longitudinally.

5. An automobile headlamp as claimed in claim 3, wherein the elastic contact leaf is a leaf spring provided on an upper side of the plastic ball bearing.

6. An automobile headlamp as claimed in claim 3, wherein the plastic ball bearing has a side frame which is L-shaped in horizontal cross section and extends from a side of the plastic ball bearing which faces a side wall of the lamp body, and wherein the elastic contact leaf is disposed on an upper side edge portion of the side frame so as to be held between the vertically opposed horizontal ribs.

7. An automobile headlamp as claimed in claim 1, wherein the two aiming screws are provided horizontally in front elevation, wherein the ball joint is provided in a position above or below the aiming screws and wherein the ball joint is coupled to a longitudinally movable rod of an auto leveling mechanism in response to a vertical inclination of an axle shaft of an automobile.

8. An automobile headlamp as claimed in claim 1, wherein an auto leveling mechanism functions as the light-distribution switching mechanism.

* * * * *